(12) United States Patent
Paget

(10) Patent No.: US 8,311,381 B2
(45) Date of Patent: Nov. 13, 2012

(54) APPARATUS FOR PROVIDING SUPPORT FOR A PORTION OF AN OPTICAL FIBRE EXTENDING FROM A SUBSTRATE

(75) Inventor: Christophe Paget, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/067,905

(22) Filed: Jul. 6, 2011

(65) Prior Publication Data

US 2012/0057840 A1  Mar. 8, 2012

(30) Foreign Application Priority Data

Jul. 6, 2010 (GB) ................................. 1011324.9

(51) Int. Cl.
*G02B 6/00* (2006.01)
(52) U.S. Cl. ........................................ 385/137; 385/147
(58) Field of Classification Search .............. 385/14, 385/15, 24, 88, 92, 115–120, 135–137, 147; 700/286, 288; 244/135, 137.4, 170; 398/98, 398/99, 100; 250/227, 227.14, 214 R
See application file for complete search history.

(56) References Cited

U.S. PATENT DOCUMENTS

| | | | | |
|---|---|---|---|---|
| 3,723,722 A * | 3/1973 | Van Iderstine et al. | ....... | 362/470 |
| 4,372,511 A * | 2/1983 | Knowles | ................ | 248/68.1 |
| 5,425,831 A * | 6/1995 | Grimes et al. | ............... | 156/179 |
| 5,615,293 A * | 3/1997 | Sayegh | ......................... | 385/102 |
| 5,740,296 A * | 4/1998 | Harris | ........................... | 385/116 |
| 5,818,998 A * | 10/1998 | Harris et al. | .................. | 385/100 |
| 6,516,131 B1 * | 2/2003 | Tullis | ............................. | 385/137 |
| 6,606,451 B2 * | 8/2003 | Honda et al. | .................. | 386/233 |
| 6,674,951 B1 * | 1/2004 | Erwin et al. | ................... | 385/134 |
| 7,137,598 B2 * | 11/2006 | Von Thal | ................... | 244/135 A |
| 7,167,627 B2 * | 1/2007 | Schwar | ........................ | 385/137 |
| 7,263,245 B2 * | 8/2007 | Delcher et al. | .................. | 385/12 |
| 7,298,536 B2 * | 11/2007 | McCann et al. | ............... | 600/310 |
| 7,664,364 B2 * | 2/2010 | Read et al. | .................... | 385/147 |
| 2010/0074581 A1 * | 3/2010 | Tanobe et al. | ................... | 385/93 |
| 2010/0074586 A1 * | 3/2010 | Panarello et al. | ............. | 385/134 |
| 2010/0202737 A1 * | 8/2010 | Saunders | ........................ | 385/69 |
| 2010/0296792 A1 * | 11/2010 | Bannister | ....................... | 385/136 |

FOREIGN PATENT DOCUMENTS

| | | |
|---|---|---|
| GB | 2 443 481 | 5/2008 |
| GB | 2 448 537 | 10/2008 |
| WO | WO 98/10316 | 3/1998 |

OTHER PUBLICATIONS

UK Search Report for GB No. 1011324.9, dated Oct. 28, 2010.

* cited by examiner

*Primary Examiner* — Akm Ullah
(74) *Attorney, Agent, or Firm* — Nixon & Vanderhye P.C.

(57) ABSTRACT

A support for an optical fiber partially submerged in a substrate is discloses in which the support is arranged with fiber fixing means for fixing a portion of the fiber to the support so that strain on the portion of the fiber external to the substrate and support member is at least partially diverted from the portion of the fiber internal to the support member.

20 Claims, 5 Drawing Sheets

APPARATUS FOR PROVIDING SUPPORT FOR A PORTION OF AN OPTICAL FIBRE EXTENDING FROM A SUBSTRATE

This application claims priority to GB Application No. 1011324.9, filed 6 Jul. 2010, the entire contents of which is hereby incorporated by reference.

FIELD OF INVENTION

The present invention relates to apparatus for providing support for an optical fibre.

BACKGROUND OF THE INVENTION

Optical fibres have a wide range of applications some of which expose optical fibres to hostile environments. One location at which optical fibres are particularly vulnerable is in the region that the optical fibre emerges from an area in which it is mechanically protected. For example, optical fibres may be attached to or embedded within a substrate and then exit the substrate at a given exit point. At this exit point, the optical fibre is particularly vulnerable to mechanical stresses. Some types of optical fibres are particularly sensitive to mechanical stress, which can damage the fibre or cause interference to the signal carried by the fibre.

SUMMARY OF THE INVENTION

An embodiment of the invention provides apparatus for providing support for an optical fibre at its point of emergence from a substrate, the apparatus comprising:
support means comprising a foot member and a resilient flexible tail member, the foot member comprising an attachment surface arranged for fixing the support means to a substrate over the point of emergence of an optical fibre from the substrate;
a conduit running within the support means between the attachment surface of the foot member and the tail member and arranged for carrying the optical fibre from the substrate to the distal end of the tail member; and
fibre fixing means arranged to fix the optical fibre within the tail member so that strain on the portion of the optical fibre that extends externally from the tail member is substantially diverted away from the portion of the optical fibre internal to the support means and onto the support means.

The optical fibre may comprise a bend-insensitive portion jointed to a bend-sensitive portion, the bend-sensitive portion being integrated with the substrate and the bend-insensitive portion being at least partially external to the substrate, the fibre fixing means being arranged to fix the bend-insensitive portion of the fibre to the support means so that strain on the bend-insensitive portion is at least partially diverted away from the bend-sensitive portion into the support member.

The foot member may comprise a base plate comprising the attachment surface for fixing to the substrate. The foot member may be bonded to the substrate. The foot member may be co-cured with the substrate. The fixing means may comprise a curable material placed around the fibre within the conduit. The setting material may be introduced into the conduit via one or more ports in the support member. The fixing means may comprise external clamping means placed around the support means so as to constrict the conduit about the fibre. The fixing means may comprise one or more flexible vanes formed on the interior wall of the conduit, the vanes being biased into engagement with the fibre and arranged to resist movement of the fibre within the conduit.

The support member may be arranged with a coefficient of elasticity that increases along the conduit from the foot member to the tail member. The support member may comprise a plurality of sections formed from selected materials, the materials being selected so that the coefficient of elasticity of the support member increases along the conduit from the foot member to the tail member. The support member may be arranged to accept a plurality of optical fibres and provides one or more at least partially dedicated conduits for the optical fibres in a common the tail member. The support member may be arranged to accept a plurality of optical fibres and provides one or more at least partially dedicated conduits and one or more dedicated tail members for one or more of the optical fibres. One or more of the optical fibres may provide communications between an aircraft system and one or more sensors. The support means may be arranged so that the portion of the optical fibre that extends externally from the tail member is maintained in a substantially parallel plane to the surface of the substrate.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
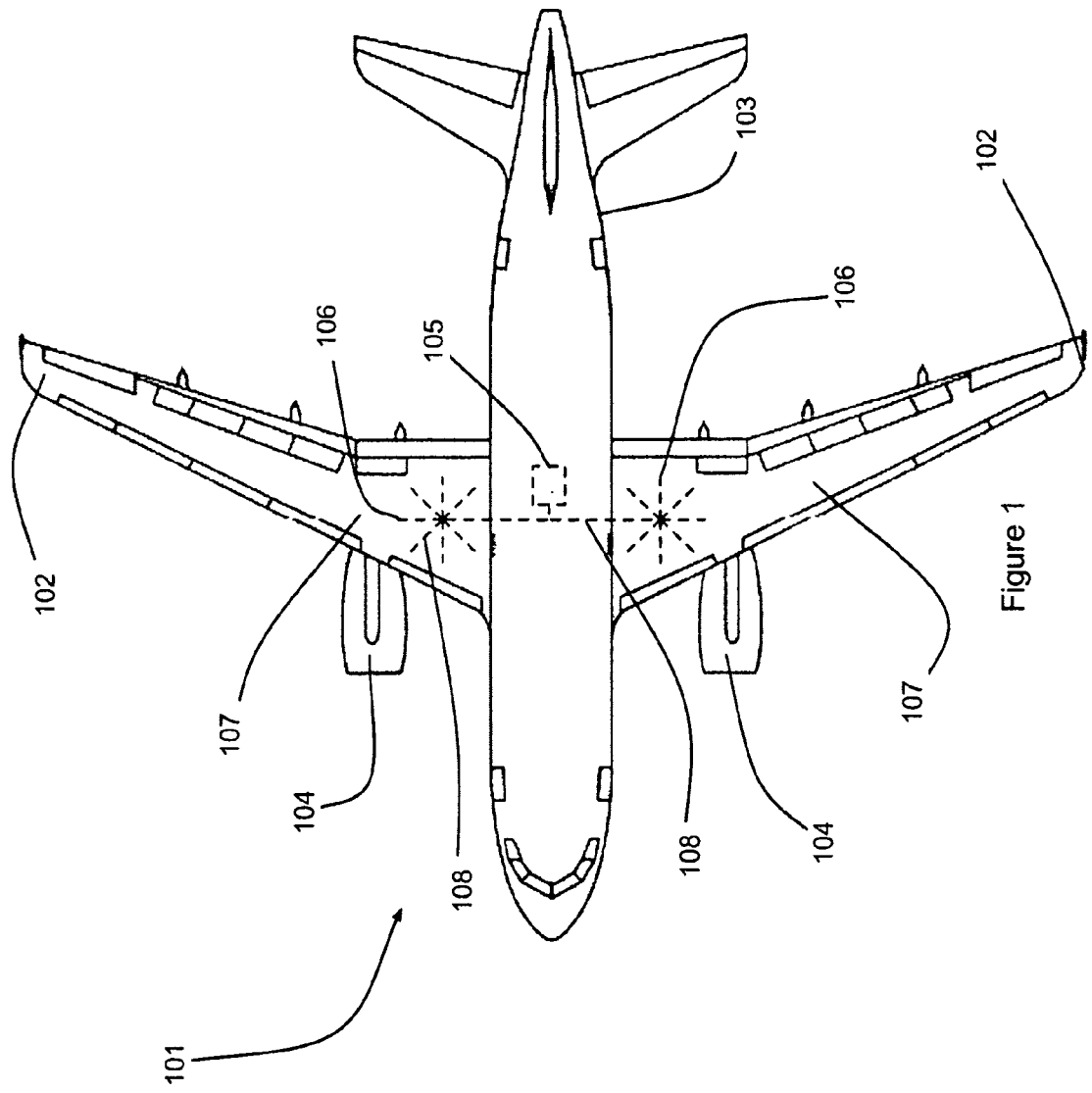
FIG. 1 is a schematic illustration of an aircraft comprising a structural health monitoring system utilising optical fibres.

With reference to FIG. 1, an aircraft 101 comprises a pair of wings 102 faired into a fuselage 103. Each of the wings 102 carries an engine 104. In the present embodiment, the aircraft 101 further comprises a structural health monitoring (SHM) system 105 arranged to monitor a set of parameters for various elements of the aircraft 101 in order to monitor the structural integrity of those elements. The SHM system 105 comprises sets of optical sensors 106 embedded in the wing covers 107 of the wings 102. The optical sensors 106 are each connected to the SHM system 105 via optical fibres 108. Each optical fibre 108 is connected at one end to a respective one of the optical sensors 106 and partially embedded in the respective wing cover 107. The optical fibres 108 each emerge from the interior surface of the respective wing covers 106 to be routed for connection to the SHM system 105.

Figure 2:
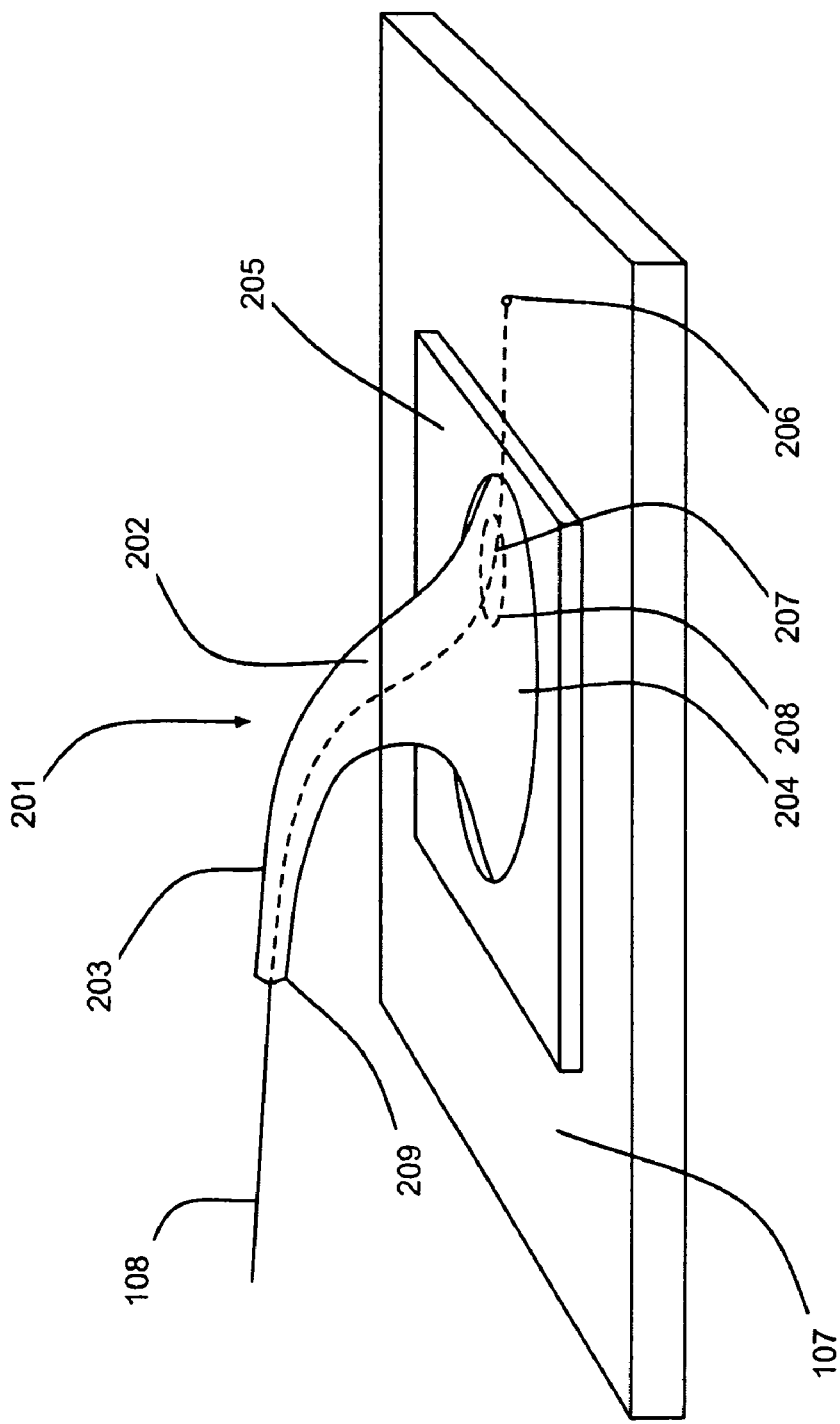
FIG. 2 is a side view of a support for an optical fibre in the aircraft of FIG. 1.

With reference to FIG. 2, in the present embodiment, at the point of emergence of each optical fibre 108 from the respective wing cover 107, the optical fibre 108 is fitted within apparatus for providing support, in the form of an optical fibre support 201. The support 201 comprises a body member 202 formed from an inert flexible resilient material, which, in the present embodiment, is silicone based. The body member 202 comprises an elongate tail member 203 integral with a foot member 204. In the present embodiment, the foot member 204 is fixed to a base plate 205. In the present embodiment, the base plate 205 is formed from a material compatible for fixing to the interior surface of the wing cover 107 by bonding or co-curing. As shown in FIG. 2, the optical fibre 108 runs within the wing cover 108 from the attached sensor 206 to the point of emergence 207 of the optical fibre 108 from the interior surface of the wing cover 107. The optical fibre 108 then runs through an opening 208 in the base plate 205 and into the body member 202 of the support 201. The optical fibre then runs though the support 201 to emerge at the tip 209 of the tail member 203 for routing to the SHM system 105.

Figure 3A:
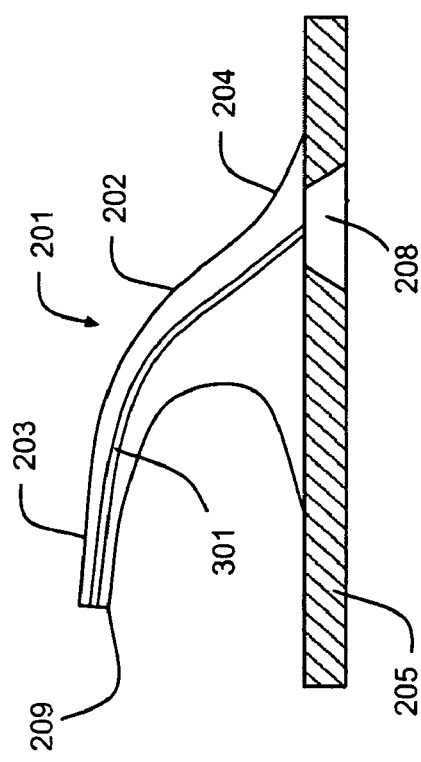
FIGS. 3a & 3b are cross sectional views of the support of FIG. 2.
Figure 3B:
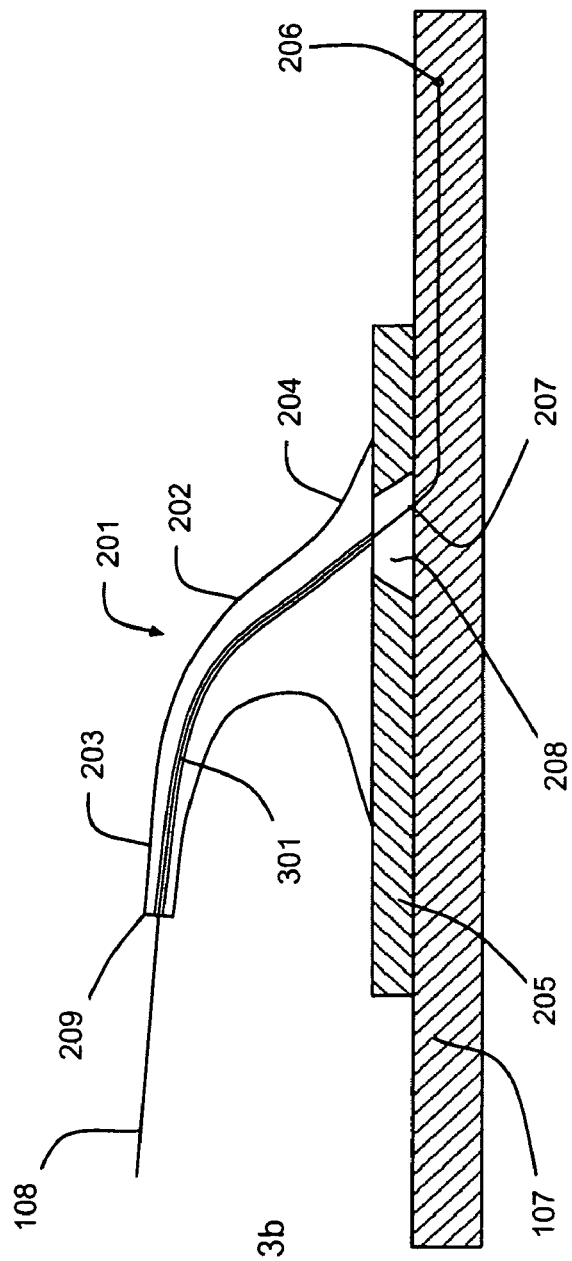

With reference to FIG. 3a, the support 201 further comprises a conduit 301 running substantially centrally through the body member 202 between the tip 209 of the tail member 203 and the surface of the foot member 204 facing the opening 208 in the base plate 205. With reference to FIG. 3b, when fitting the support 201 to the optical fibre 108 embedded within the wing cover 107, the free end of the optical fibre 108 is first inserted into the conduit 301 via the opening 208 and passed centrally through the body member 202 to emerge at the tip 209 of the tail member 203. The support 201 is then moved along the optical fibre 108 towards the wing cover until the base plate 204 is adjacent the interior surface of the wing cover 107. The support 201 is then bonded or co-cured in place on the interior surface of the wing cover 107. Alternatively, the support 201 may be placed over the optical fibre 108 from either direction prior to the optical fibre 108 being embedded in the wing cover. The support may then be co-cured with the wing cover or bonded to the wing cover after embedding of the optical fibre 108.

Figure 4:
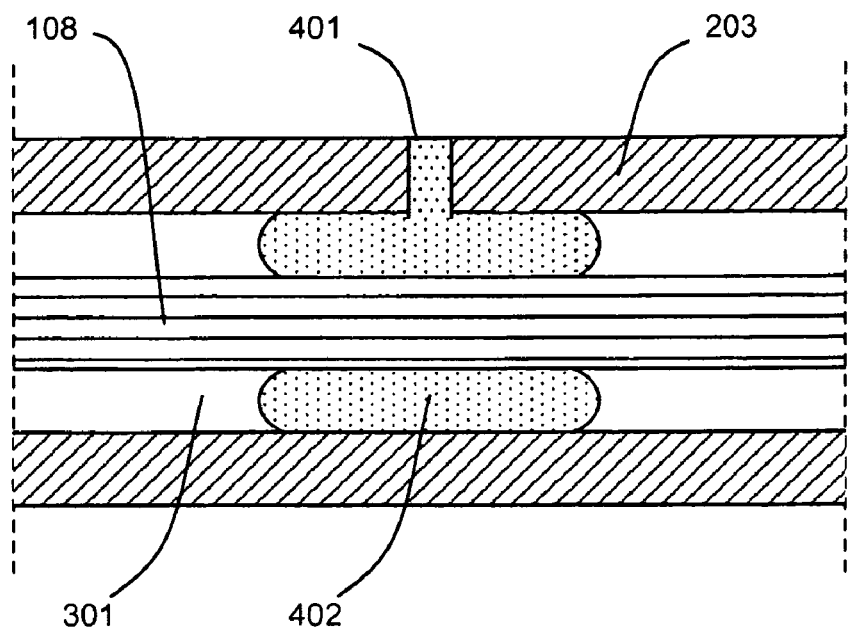
FIG. 4 is a cross sectional view of fibre fixing means of the support of FIG. 2.

With reference to FIG. 4, in the present embodiment, the tail member 203 comprises a port 401 arranged to provide fluid communication between the outer surface of the tail member 203 and the conduit 301. The port 401 is provided so that a fixing agent 402, in the form of curable liquid silicone, can be injected into the conduit 301 so as to surround the optical fibre 108. When the silicone 402 sets, the optical fibre 106 is fixed to the conduit 301 within the tail member 203. Fixing the optical fibre 108 to the support 201 enables stresses resulting from movement of the free end of the optical fibre 108 to be absorbed by the support means 201 instead of the stresses being transmitted further along the fibre towards its more vulnerable section such as its point of emergence 207 from the wing cover 107. Furthermore, where the optical fibre 108 comprises a bend sensitive portion embedded within the wing cover 107 and jointed to a bend insensitive portion, it is increasingly advantageous to reduce the movement and stresses transmitted to the bend sensitive portion of the fibre. Thus, in this case, the bend insensitive portion of the fibre 108 is fixed to the support member thus diverting stresses away from the bend sensitive portion housed within the support member 201.

Figure 5:
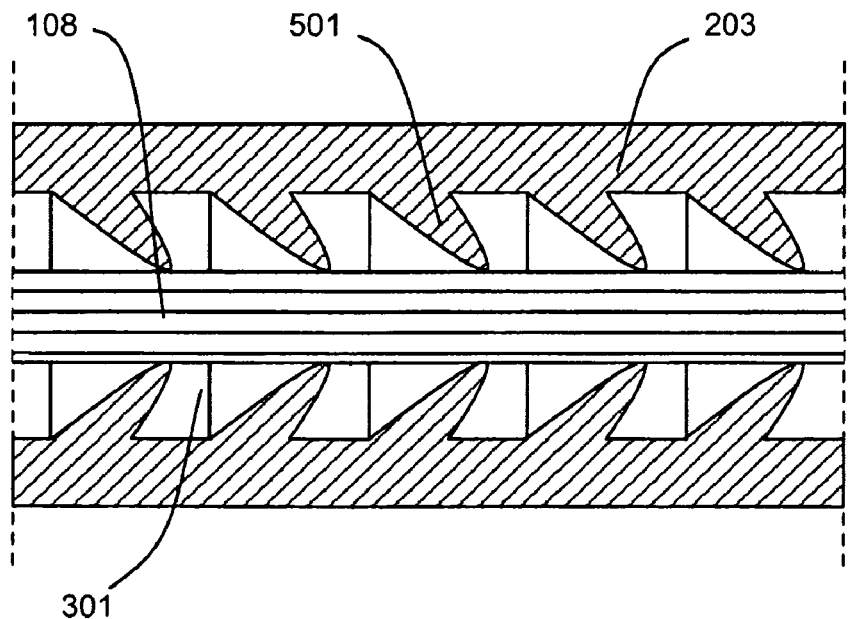
FIG. 5 is a cross sectional view of fibre fixing means in accordance with another embodiment.

In another embodiment, with reference to FIG. 5, the fixing means comprises a set of circumferential vanes 501 axially spaced along the interior surface of the conduit 301. Each vane 501 is angled away from the free end of the optical fibre 108. Without the optical fibre 108 present, the vanes 501 provide successive restrictions within the conduit 301 so that when the optical fibre 108 is inserted past the vanes 501 the vanes 501 are biased into contact with the optical fibre 108. Thus, the vanes 501 act to hold the optical fibre 108 and to resist it being pulled out of the support 201 and thus divert stresses from the fibre 108 to the support 201 for absorption.

In a further embodiment, the vanes are angled towards the embedded end of the optical fibre so as to assist in the threading of the support onto the free end of the optical fibre. When the support is in position fixed to the substrate, the vanes are arranged to grip the optical fibre so as to resist its movement relative to the support. Further fixing means may be provided for any embodiment comprising vanes as described above. For example, a silicone based fixing agent may used to fix the optical fibre to the support. As will be understood by those skilled in the art, vanes may be formed in any suitable shape to provide the optimum support and fixing characteristics for a given application. Vanes may be arranged singly or in groups and may be oriented with common or opposing angles or may have common or differing shapes. Vanes may be formed so as to provide varying or different degrees of constriction of the conduit.

Figure 6:
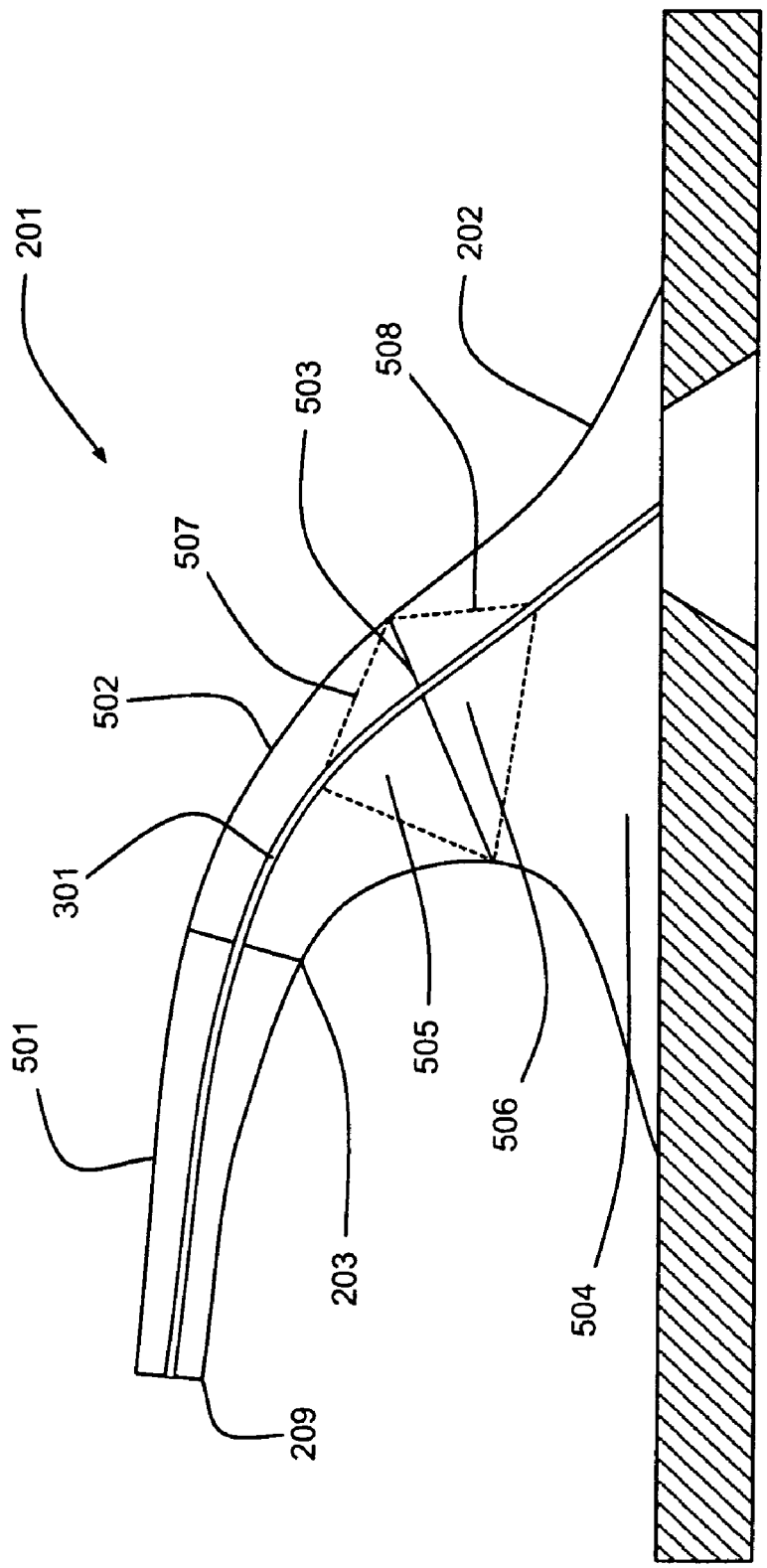
FIG. 6 is a cross sectional side view of a support for an optical fibre in accordance with a further embodiment of the invention.

With reference to FIG. 6, in accordance with another embodiment, the support 201 is moulded in a first, second, third and fourth sections 501, 502, 503, 504 each comprising a different material. The materials for each section 501, 502, 503, 504 are selected so as to increase the elasticity of the support member 201 from one end to the other. In the present embodiment, the support member is arranged to be less elastic at its base end and more elastic towards its tail end. Thus the materials for the four sections 501, 502, 503, 504 are selected with appropriate moduli of elasticity (E) with the sections towards the tail end having a greater modulus of elasticity than those sections towards the base end of the support 201.

In addition, in the present embodiment, the interfaces between the sections 501, 502, 503, 504 are formed so that they can be joined at differing relative angles of rotation so as to provide a range of orientations of the tip 209 of the tail member 203 relative to the base member 202. In addition, the third section 503 is formed in the shape of two cones 505, 506 joined at their bases, the cones 505, 506 being eccentric about the conduit 301. The corresponding faces of the second and fourth sections 502, 504 are each formed as corresponding cone shaped sockets 507, 508 so as to accept the respective cone 505, 506 of the third section 503. Thus the cones 505, 506 and sockets 507, 508 provide an articulated joint for setting the orientation of the tip of the support member 201 relative to the base member.

As will be understood by those skilled in the art, the support may be formed from any number of sections as described with reference to FIG. 6 with one or more of the sections being formed from different or the same material. The sections may be formed separately or together, for example, by co-moulding. The interfaces between sections may be any suitable shape, such as ball and socket, so that a single moulding can be arranged to provide a range of positioning of the tail member relative to the base member. The sockets and corresponding parts may be arranged to be concentric with the conduit.

In another embodiment, vanes for gripping an inserted optical fibre are provided at one or more of the interfaces between one or more of the sections of a multi-part support member. For example, a vane may be formed at the tip of a cone shaped interface surface by extending the moulding of the tip of the cone so as to protrude into the conduit. More than one such vane may be provided. Two or more such vanes may be provided with common or opposing orientations.

In a further embodiment, the support member is co-moulded with the optical fibre. In another embodiment, the base plate is formed from the same material as the substrate, such as the wing cover. In a further embodiment, the base plate is omitted and the foot member comprises an attachment surface that is bonded directly to the substrate. As will be understood by those skilled in the art, the support member may be bonded or co-cured to a composite substrate or bonded or otherwise fixed to a bare, primed or fully painted metallic or other substrate. The support member may be self-adhesive when provided with or without a base plate. As will be understood by those skilled in the art, the optical fibres may be embedded or surface mounted in a composite substrate or surface mounted to other substrates.

As will be understood by those skilled in the art, the fixing means may be provided externally to the conduit. For example, the fixing means may be an external clip, crimped ring, zip-tie placed around the tail member so as to compress the tail member and clamp the optical fibre within the conduit.

In another embodiment, the fixing agent, such as curable silicone, is injected in the tip of the tail member. In a further embodiment, the fixing agent is injected at a plurality of ports along the conduit. In another embodiment, the fixing agent is injected through the wall of the support using a needle or other suitable piercing device.

As will be understood by those skilled in the art, any joint between sections of the optical fibre may be submerged in substrate or housed within support. The optical sensors may be integral with optical fibre or discrete sensors. The optical sensors may be arranged one or more functions such as strain, temperature, acoustic emissions measurement or active acoustic emissions detection, for example, using guided Lamb waves. The optical fibre may be installed at any suitable depth in the substrate or may by surface mounted. The support may provide for housing a plurality of optical fibres within a single conduit. The support may provide for multiple incoming or outbound conduits or both. Such conduits may provide at least a partially exclusive path dedicated to a given optical fibre. The support may provide a plurality of tail members each providing one or more conduits for one or more optical fibres. The support may be arranged to accommodate one or more joint mechanisms such as plug and socket arrangements for optical fibres. The optical fibre may be bend insensitive fibre up to the optical sensor or may comprise one or more jointed sections of bend sensitive fibre and bend insensitive fibre. The optical fibre may by single mode fibre or multi-mode fibre.

As will be understood by those skilled in the art, embodiments may be applied to other applications than SHM, such as engine, aircraft systems or flight physics health monitoring or communications. Furthermore, the support described herein may be used in any other application where the free end of a fibre or other cable-like member, such as an electrical cable, requires support and protection at its point of emergence from a substrate to which it is embedded, surface mounted or otherwise supportively fixed or attached. Where an optical fibre is surface mounted, the attachment surface of the foot member of the support may be modified to accommodate the protrusion of the surface optical fibre.

As will be understood by those skilled in the art, optical fibres generally comprise one or more optical cores coated with one or more cladding or protective layers. The coated fibre may be further ruggedized with one or more further dressing or coating layers. The term optical fibre is used herein to refer to any form of optical fibre or optical fibre cable or fibre optic.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the applicant's general inventive concept.

The invention claimed is:

1. An apparatus for providing support for an optical fibre at a point of emergence of said optical fibre from a substrate, said apparatus comprising:
   a support comprising a foot member and a resilient flexible tail member, said foot member comprising an attachment surface arranged for fixing said support to said substrate over the point of emergence of said optical fibre from said substrate;
   a conduit running within said support between said attachment surface of said foot member and said tail member, said conduit configured to carry said optical fibre from said substrate to a distal end of said tail member; and
   a fibre holder configured to fix said optical fibre within said tail member so that strain on a portion of said optical fibre that extends externally from said tail member is substantially diverted away from the portion of said optical fibre internal to said support and onto said support.

2. An apparatus according to claim 1 in which said optical fibre comprises a bend-insensitive portion jointed to a bend-sensitive portion, said bend-sensitive portion being integrated within said substrate and said bend-insensitive portion being at least partially external to said substrate, said fibre holder is configured to fix said bend-insensitive portion of said fibre to said support so that strain on said bend-insensitive portion is at least partially diverted away from said bend-sensitive portion into said support.

3. An apparatus according to claim 1 in which said foot member comprises a base plate comprising said attachment surface for fixing to said substrate.

4. An apparatus according to claim 1 in which said foot member is bonded to said substrate.

5. An apparatus according to claim 1 in which said foot member is co-cured with said substrate.

6. An apparatus according to claim 1 in which said fibre holder comprises a curable material placed around said fibre within said conduit.

7. An apparatus according to claim 6 in which said curable material is introduced into said conduit via one or more ports in said support.

8. An apparatus according to claim 1 in which said fibre holder comprises an external clamp placed around said support constricting said conduit about said fibre.

9. An apparatus according to claim 1 in which said fibre holder comprises at least one flexible vane formed on an interior wall of said conduit, said vane is biased into engagement with said fibre and configured to resist movement of said fibre within said conduit.

10. An apparatus according to claim 1 in which said support has a coefficient of elasticity that increases along said conduit from said foot member to said tail member.

11. An apparatus according to claim 1 in which said support comprises a plurality of sections formed from materials having a coefficient of elasticity which increases along said conduit from said foot member to said tail member.

12. An apparatus according to claim 1 in which said support is configured to accept a plurality of optical fibres and provides at least one at least partially dedicated conduit for said optical fibres in said tail member.

13. An apparatus according to claim 1 in which said support is configured to accept a plurality of optical fibres and provides at least one at least partially dedicated conduit and at least one dedicated tail member for at least one of said optical fibres.

14. An apparatus according to claim 1 in which at least one of said optical fibres provides communications between an aircraft system and at least one sensor.

15. An apparatus according to claim 1 in which said support is configured so that the portion of said optical fibre that extends externally from said tail member is maintained in a substantially parallel plane to the surface of said substrate.

16. An apparatus for providing support for an optical fibre at a point of emergence from a substrate, said apparatus comprising:

means for supporting said optical fibre, said supporting means comprising:

a foot member; and a resilient flexible tail member, said foot member comprising an attachment surface arranged for fixing said supporting means to said substrate over the point of emergence of said optical fibre from said substrate;

a conduit running within said supporting means between said attachment surface of said foot member and said tail member, said conduit configured to carry said optical fibre from said substrate to a distal end of said tail member; and means for fixing said optical fibre within said tail member so that strain on the portion of said optical fibre that extends externally from said tail member is substantially diverted away from the portion of said optical fibre internal to said supporting means and onto said support means.

17. An apparatus according to claim 16 in which said means for fixing comprises a curable material placed around said fibre within said conduit.

18. An apparatus according to claim 17 in which said curable material is introduced into said conduit via one or more ports in said support.

19. An apparatus according to claim 16 in which said means for fixing comprises an external means for clamping said means for supporting about said fibre.

20. An apparatus according to claim 16 in which said means for fixing comprises at least one flexible vane formed on an interior wall of said conduit, said vane is biased into engagement with said fibre and configured to resist movement of said fibre within said conduit.

* * * * *